2,819,157
Patented Jan. 7, 1958

2,819,157

METHOD OF TREATING SULFIDE SOLIDS UNDER SOLIDS FLUIDIZING CONDITIONS

Francois Albert Fischer, Boulder City, Nev., assignor to Dorr-Oliver Incorporated, Stamford, Conn., a corporation of Delaware No Drawing. Application July 17, 1953
Serial No. 368,833

3 Claims. (Cl. 75—9)

The present invention relates generally to the contacting of solids with gases in accordance with the so-called fluidized solids technique.

The application of the so-called fluid solids technique in the roasting of sulfide ores to yield $SO_2$ gas or in the gasification of solid fuels, etc., is well known in the art. In this process, the finely divided solids in a fluidizable particle size range of from dust up to ½ inch are fed to a reaction zone wherein they are maintained, at reaction temperatures, in the form of a dense turbulent suspension of finely-divided solids fluidized by an upwardly flowing gas stream. The velocity of the uprising gases is measured linearly as if the gases were passing through a reactor devoid of solids. This gas velocity is referred to as space rate. A freeboard or dust disengaging space is maintained above the upper level of the bed so that the dense suspension of solids assumes the form of a fairly well defined bed with a distinct interface between the bed and the overlying freeboard space wherein there is a dilute suspension of entrained fine solids.

Fluid operation results in excellent diffusion of heat through the fluidized bed and is, therefore, particularly well adapted for treating solids at elevated temperatures. Typical processes are exothermic reactions, like sulfide roasting, where the temperature is maintained by the heat of reaction, and the endothermic calcination of limestone wherein heat is supplied by burning fuel directly in the fluidized bed or by supplying hot gases and/or entrained solids to the bed.

Temperature control in exothermic reaction beds is exercised by any conventional means of extracting or absorbing heat from the bed such as the simultaneous carrying out of endothermic reactions or the vaporizing of water therein, supplying recycled cooled solids or gases to the beds, or by the use of coils, etc.

In all cases of fluidization as presently practiced the limitations must be observed that the bed temperature does not exceed the fusion point of the bed solids lest fluidization cease. This limitation has previously confined the fluidized technique to the processing of only those solids that do not soften or sinter at desired reaction temperatures.

There are many solids such as certain zinc blends, speiss, galena concentrates and the like, which, because of low melting constituents or impurities, tend to soften or fuse at reaction temperatures and so have heretofore resisted all attempts at processing by the fluidized technique.

Additionally, there are other solids such as pyrites, pyrrhotites and the like which tend to soften or fuse at high reaction temperatures so therefore require low reaction temperatures and, consequently, low reaction rates during treatment.

So it is an object of this invention to provide a process for the treatment of materials that tend to soften or fuse at reaction temperatures and yet to carry out the processing under continuous solids fluidizing conditions without defluidization due to fusion of the solids.

It is a further object of the invention to provide a process for transforming the solids into pellets during treatment thereby minimizing dust losses and increasing reactor capacity while at the same time yielding an easily handled product amenable to further processing. And a still further object is to provide a process for the high temperature treatment of all of these materials whereby the reaction rate is increased due both to the increased temperature and to the increased gas velocities.

The concept of my invention revolves about the discovery that materials which tend to fuse at reaction temperatures can nevertheless be maintained fluidized by increasing the fluidizing gas velocities thereby imparting greater turbulent energy to the bed. This increased gas velocity unexpectedly prevents complete fusion of the bed solids and causes the material to agglomerate into pellets thus cutting down the dust loss by entrainment. Moreover, since the capacity of a reactor is dependent to a large measure upon the fluidizing gas velocities, my invention provides for an increase in capacity due to the allowance of increased gas velocities without excessive dust losses.

Thus, in its broadest aspect, my invention comprises heating a mass of finely-divided solids to the fusion temperature of such solids when in the non-fluidized state while maintaining them as a fluidized bed by passing a stream of gas upwardly through the mass of solids at a velocity sufficient to render the heated solids as a turbulent mass of finely-divided solids exhibiting liquid-like surface tendencies.

In somewhat more detail, the invention presents a process for roasting finely-divided sulfide-bearing ores under solids fluidizing conditions whereby a mass predominating in previously roasted solids is maintained at reaction temperatures in excess of the normal fusion temperature of the solids, the mass being fluidized by an uprising stream of oxygen-bearing gases necessary for the roast, solids to be roasted are supplied to the fluidized mass while a proportionate quantity of roasted solids are discharged therefrom.

Although the gas velocities required for the practice of this invention will vary from case to case, nevertheless it may be generalized that satisfactory results can be obtained by increasing the gas velocities from one to four times over those employed for fluidizing other particles of the same size and specific gravity.

Types of solids that are amenable to the pelletized roasting process of my invention are those which become sticky or adhesive at or below reaction temperatures so that agglomeration is favored. The exact mechanism of my process is not completely understood as yet, but it may be theorized that during treatment the action of the increased gas velocities tends to break up or prevent large agglomerates in the bed while promoting the formation of relatively small pellets. These small pellets are larger than the feed particles therefore dust loss by entrainment is minimized. In other words, increased gas velocities actually cut down dust losses instead of increasing them as would normally be expected.

Stated another way, it may be theorized that the increased gas velocities tend to overcome the initial tendency of the solids to fuse thereby permitting increased temperatures which in turn tend to promote fusion and the net result is a higher temperature reaction in which the turbulence does not quite completely offset the increased tendency to fuse so that minor agglomeration occurs within the bed to yield roasted pellets therein with a concomitant diminution in dust carry-over and a greatly increased capacity.

My process is particularly well suited for the treatment of fine solids such as flotation concentrates where most of the feed-solid particles will pass through a 100 mesh Tyler screen. However, the process can be employed for the pelletizing roasting of larger materials so long as the product pellets do not exceed a maximum fluidizing range of, say, ½ inch.

This invention can be practiced in any conventional fluidized solids reactor such as are well known in the art and literature.

Example I

In experimental work, a flotation concentration of galena was roasted under fluidized conditions: The approximate chemical analysis of the feed was:

| | Percent |
|---|---|
| Pb | 68 |
| Cu | 4.3 |
| Zn | 4.7 |
| Fe | 3.3 |
| S | 14 |

Roasting was carried out by means of the exothermic reaction between sulfur of the solids and oxygen in the uprising fluidizing gases. Preliminary cold tests indicated that the space rate (the linear velocity of the fluidizing gases through an empty reactor) should be 1 foot per second, however, upon reaching a temperature of 525° C. the bed solids fused and fluidization ceased. The space rate was increased to 3 feet per second in accordance with this invention, and fluidization proceeded apace even though the roasting temperature reached 650° C.

During roasting the solids increased in size so that the product was 95% retained on a 150 mesh Tyler screen whereas the unroasted feed was so small that over 85% passed through a 200 mesh Tyler screen.

Example II

In experimental work finely-divided speiss having an approximate analysis of:

| | Percent |
|---|---|
| Cu | 30 |
| Pb | 5 |
| As | 35 |
| Sb | 6 |
| Fe, Ni+Co | 18 | was roasted to drive off the arsenic and render the material amenable to further processing. The solids were fluidized at a space rate of two feet per second and temperatures up to 800° C. The solids increased in size during roasting so that the product was 73% retained on a 100 mesh (Tyler) screen whereas 70% of the initial feed passed through a 100 mesh (Tyler) screen.

Earlier attempts to roast this material at a space rate of 1 foot per second were unsuccessful because the solids fused and fluidization ceased at temperatures in the neighborhood of 500° C.

Example III

In experimental work, zinc (blende) flotation concentrate was roasted. The concentrate had the following approximate analysis:

| | Percent |
|---|---|
| Zn | 50 |
| Cu | 3 |
| Pb | 2 |
| Fe | 5 |
| S | 31 | and was successfully roasted under fluidized conditions at a space rate of two feet per second and temperatures up to 925° C. Although the feed was fine enough so that 81% passed through a 200 mesh (Tyler) screen, the roasted product was 86% retained on a 150 mesh (Tyler) screen. Earlier attempts to roast this same material at a standard space rate of one foot per second and temperatures of approximately 850° C. were unsuccessful.

I claim:

1. The process for treating finely divided sulfide solids under solids fluidizing conditions and at temperatures above the fusion point of such solids, comprising the steps of maintaining a mass of such solids at fusion temperatures whereby such solids fuse into agglomerates of increased size, treating such fused solids in such bed and continuously maintaining a mass of such fused solids as a fluidized bed during such treatment by passing fluidizing gases upwardly therethrough at a velocity in excess of that velocity required to fluidize the same solids at temperatures below their fusion point.

2. The process according to claim 1 in which the velocity of the fluidizing gases is two to four times that velocity required to fluidize the same solids at temperatures below their fusion temperatures.

3. A method for the fluidized roasting of finely divided sulfide solids that fuse at roasting temperatures, comprising the steps of introducing such finely divided solids into a reaction zone and therein establishing a bed of such solids, fluidizing such bed of solids with an uprising treatment gas stream, heating solids in such bed to treatment temperatures above the fusion point of such solids, fusing such heated solids within such bed into agglomerates of a greater size than that of the solids initially introduced into such bed, continuously maintaining said agglomerates fluidized within such bed until such solids are completely treated therein by maintaining the velocity of the uprising gas stream to be in excess of that required to fluidize the bed if the solids thereof were at temperatures below the fusion point.

References Cited in the file of this patent

UNITED STATES PATENTS

| 2,478,912 | Garbo | Aug. 16, 1949 |
| 2,485,604 | Kalbach | Oct. 25, 1949 |
| 2,510,823 | Krebs | June 6, 1950 |
| 2,563,086 | Verschoor | Aug. 7, 1951 |
| 2,596,580 | McKay et al. | May 13, 1952 |
| 2,650,159 | Tarr et al. | Aug. 25, 1953 |

FOREIGN PATENTS

| 645,977 | Great Britain | Nov. 15, 1950 |